United States Patent
Maratta

(10) Patent No.: US 8,695,994 B2
(45) Date of Patent: Apr. 15, 2014

(54) BOARD SLIDING DEVICE WITH AIR PUMP FOR SLIDING ON GROUND

(71) Applicant: Mark Maratta, Kailua, HI (US)

(72) Inventor: Mark Maratta, Kailua, HI (US)

(*) Notice: Subject to any disclaimer, the term of this patent is extended or adjusted under 35 U.S.C. 154(b) by 0 days.

(21) Appl. No.: 13/666,446

(22) Filed: Nov. 1, 2012

(65) Prior Publication Data

US 2013/0056942 A1 Mar. 7, 2013

Related U.S. Application Data

(63) Continuation-in-part of application No. 13/228,402, filed on Sep. 8, 2011, which is a continuation-in-part of application No. 12/326,560, filed on Dec. 2, 2008, now Pat. No. 8,016,304, which is a continuation-in-part of application No. 11/347,523, filed on Feb. 3, 2006, now Pat. No. 7,458,592.

(51) Int. Cl.
*B62M 27/00* (2006.01)

(52) U.S. Cl.
USPC .......................................... 280/12.13; 280/19

(58) Field of Classification Search
USPC .................. 280/87.01–87.051, 13, 14.1–19
See application file for complete search history.

(56) References Cited

U.S. PATENT DOCUMENTS

| | | | |
|---|---|---|---|
| 613,298 A | 11/1898 | Palmtag | |
| 1,123,686 A * | 1/1915 | Bjorndahl | 280/87.042 |
| 3,221,830 A | 12/1965 | Walsh | |
| 3,589,463 A | 6/1971 | Stowers | |
| 3,710,881 A | 1/1973 | Thompson | |
| 3,821,994 A | 7/1974 | Bergius | |
| 3,869,011 A * | 3/1975 | Jensen | 180/9.23 |
| 4,145,064 A | 3/1979 | Carn | |
| 4,337,961 A * | 7/1982 | Covert et al. | 280/87.042 |
| 4,440,408 A * | 4/1984 | Velman | 280/7.12 |
| 4,572,528 A * | 2/1986 | McBride | 280/844 |
| 4,600,073 A * | 7/1986 | Honett | 180/181 |
| 4,627,630 A * | 12/1986 | Hutter | 280/28.5 |
| 4,984,648 A * | 1/1991 | Strzok | 180/181 |
| 5,305,846 A * | 4/1994 | Martin | 180/181 |
| 5,320,369 A * | 6/1994 | Bears | 280/18 |
| 5,447,479 A | 9/1995 | Gvoich | |
| 5,580,096 A * | 12/1996 | Freilich | 280/844 |
| 5,730,241 A | 3/1998 | Shyr | |
| 6,007,074 A * | 12/1999 | Tarng | 280/11.115 |
| 6,209,894 B1 * | 4/2001 | Walker, IV | 280/87.042 |
| 6,367,827 B1 | 4/2002 | Schneider | |
| 6,431,560 B2 | 8/2002 | Cummings | |

(Continued)

*Primary Examiner* — Jeffrey J Restifo
*Assistant Examiner* — Erez Gurari
(74) *Attorney, Agent, or Firm* — Leighton K. Chong

(57) ABSTRACT

A sliding device for sliding on the ground down a sloped or inclined surface (grass, dirt, sand, synthetic turf, etc.) has an upper deck and a slide mechanism mounted below and in parallel with the upper deck. The slide mechanism has a slide base formed by upper and lower planar members spaced apart and extending horizontally in parallel, with an enclosure formed by left and right braces and front and rear braces with radiused ends, and an endless anti-friction belt is entrained to slide around the slide base. The slide base is formed as an air tight enclosure provided with a portable air pump mechanism, and the lower planar member has an array of small air holes to let pumped air out to form an air layer between the lower planar member and the belt sliding around it for reducing friction and higher downhill sliding speeds. The device may be used for sliding down a hill like a body board, boogie board, surfboard, sled, ski, or skateboard.

10 Claims, 19 Drawing Sheets

(56) References Cited

U.S. PATENT DOCUMENTS

| | | |
|---|---|---|
| 6,435,290 B1 * | 8/2002 | Justus et al. .................. 180/9.1 |
| 6,561,118 B2 | 5/2003 | Mead |
| 6,729,651 B2 | 5/2004 | Pace |
| 7,000,930 B2 * | 2/2006 | Smith ...................... 280/87.021 |
| D561,288 S * | 2/2008 | Jordan ......................... D21/765 |
| 7,458,592 B2 * | 12/2008 | Maratta .................... 280/87.041 |
| 2004/0183269 A1 * | 9/2004 | Hadzicki et al. ......... 280/87.042 |
| 2009/0079150 A1 * | 3/2009 | Maratta ........................ 280/28.5 |

* cited by examiner

SLIDE MECHANISM ASSEMBLED VIEW

SLIDE MECHANISM FRONT VIEW

FRONT

REAR

SLIDE MECHANISM ASSEMBLED VIEW

SLIDE MECHANISM FRONT VIEW

BOARD SLIDING DEVICE WITH AIR PUMP FOR SLIDING ON GROUND

This is a continuation-in-part application from U.S. patent application Ser. No. 13/228,402, filed on Sep. 8, 2011, which was a continuation-in-part application from U.S. patent application Ser. No. 12/326,560 filed on Dec. 2, 2008, which issued as U.S. Pat. No. 8,016,304 on Sep. 13, 2011, which was a continuation-in-part application from U.S. patent application Ser. No. 11/347,523 filed on Feb. 3, 2006, which issued as U.S. Pat. No. 7,458,592 on Dec. 2, 2008, all by the same inventor.

TECHNICAL FIELD

This invention generally relates to a board sliding or similar device for sliding on the ground (grass, dirt or synthetic turf) down a hill or other inclined surface, and especially one which is safe to use and can provide hours of fun, while also being inexpensive to fabricate, having few moving parts, and being simple to assemble, use, and maintain.

BACKGROUND OF INVENTION

Practically everyone at one time or another has used a sled to slide down a hill on snow and remembers what fun it was. However, during the summer when hills are covered by grass or dirt or in climates that do not have snow, there is no "summer sled" or "grass sled" that can provide similar fun. Some prior devices have attempted to provide a board or ski with ground friction-reducing mechanisms for this purpose. As examples, U.S. Pat. No. 6,367,827 shows a slider board with side rails mounting a crawler track over a series of rollers in a line from front to back. U.S. Pat. No. 6,007,074 shows a boot-mounting skateboard fitted with an endless belt tracked around a pair of spaced apart rollers. U.S. Pat. No. 4,572,528 shows a grass ski with boot mounting and a slider belt entrained over a spring-loaded system below. U.S. Pat. No. 4,440,408 shows an elevated seat mounted on a ski board sliding on an endless belt supported on rollers. U.S. Pat. No. 6,209,894 shows a ground sled supported on parallel front-to-back wheel racks. U.S. Pat. No. 6,431,560 shows a sliding board which has clamps for holding blocks of ice on its lower surface to eliminate friction when used on the ground. Other devices have been proposed that provide variations of a tracking sled, ski, or skateboard powered with an endless belt driven by a motor.

However, these types of prior board or sled devices have required complicated and expensive bearings, mounting, and/or tracking systems which make them very costly to manufacture and difficult to maintain in fault-free, usable condition. The various types of "grass skis" or "grass skateboards" also have complicated systems of wheels, rollers, or belts. In addition, the presence of a wheeled, rollered, or tracked system beneath a slider board, ski, or skateboard elevates its height above the ground and risks possible injury to the user from tipping or flipping over. Standing up, sitting on a seat, or sitting or lying on an elevated board also does not give the user as keen a sense of being in contact with and sliding or "surfing" on the ground.

SUMMARY OF INVENTION

In accordance with the present invention, a sliding device for sliding on the ground has an upper deck extending a given length in a longitudinal direction and a given width in a transverse direction thereof for supporting a rider thereon, and a slide mechanism which is mounted below and in parallel with the upper deck, having a slide base extending in the longitudinal direction substantially the length of the upper deck and being formed by an upper planar member spaced apart from a lower planar member, both being elongated in the longitudinal direction and forming an enclosure by being fastened to left and right side braces and opposing front and rear braces with radiused ends, and an endless anti-friction belt entrained to slide longitudinally around the upper and lower planar and front and rear radiused ends of the slide base so as to enable the sliding device to slide down a hill or inclined surface. Front and back rollers may be mounted transversely on front and rear portions of the slide base, so that the belt may be entrained around the front and back rollers for straighter and more stable tracking and reduced friction for higher downhill sliding speeds.

In a preferred embodiment, the slide base is formed as an air tight enclosure provided with a portable air pump mechanism for pumping air into the slide base enclosure, and the lower planar member has an array of small through holes to let pumped air out from the slide base enclosure to form an air layer between the lower planar member and the belt sliding around it for reducing friction between the lower planar member and the belt for even higher downhill sliding speeds.

Other objects, features, and advantages of the present invention will be explained in the following detailed description of the invention having reference to the appended drawings.

DETAILED DESCRIPTION OF INVENTION

In the following detailed description, certain preferred embodiments are described with specific details set forth in order to provide a thorough understanding for practice of the present invention. However, it will be recognized by one skilled in the art that the present invention may be practiced with modifications or with equivalents thereof given the principles disclosed herein. In other instances, well known methods, procedures, components, functions have not been described in detail as not to unnecessarily obscure aspects of the present invention.

As a general principle, the present invention seeks to provide a sliding device for recreational purposes, which involve sliding on the ground down a sloped or inclined surface (grass, dirt, sand, synthetic turf, etc.). The sliding device allows the rider to travel down a hill by reducing friction between the hill surface and the device. The friction-reducing mechanism has a slide base over which is entrained a wide, anti-friction belt. The belt can be made of rubber, high-density plastic or other durable material formed in a circular band, providing an endless anti-friction sliding surface between the slide base and the ground. The slide mechanism may recessed in a cavity formed in the bottom surface of the deck or board to reduce the overall height of the device and separate the rider's hands or feet from contacting the moving belt.

Figure 1:
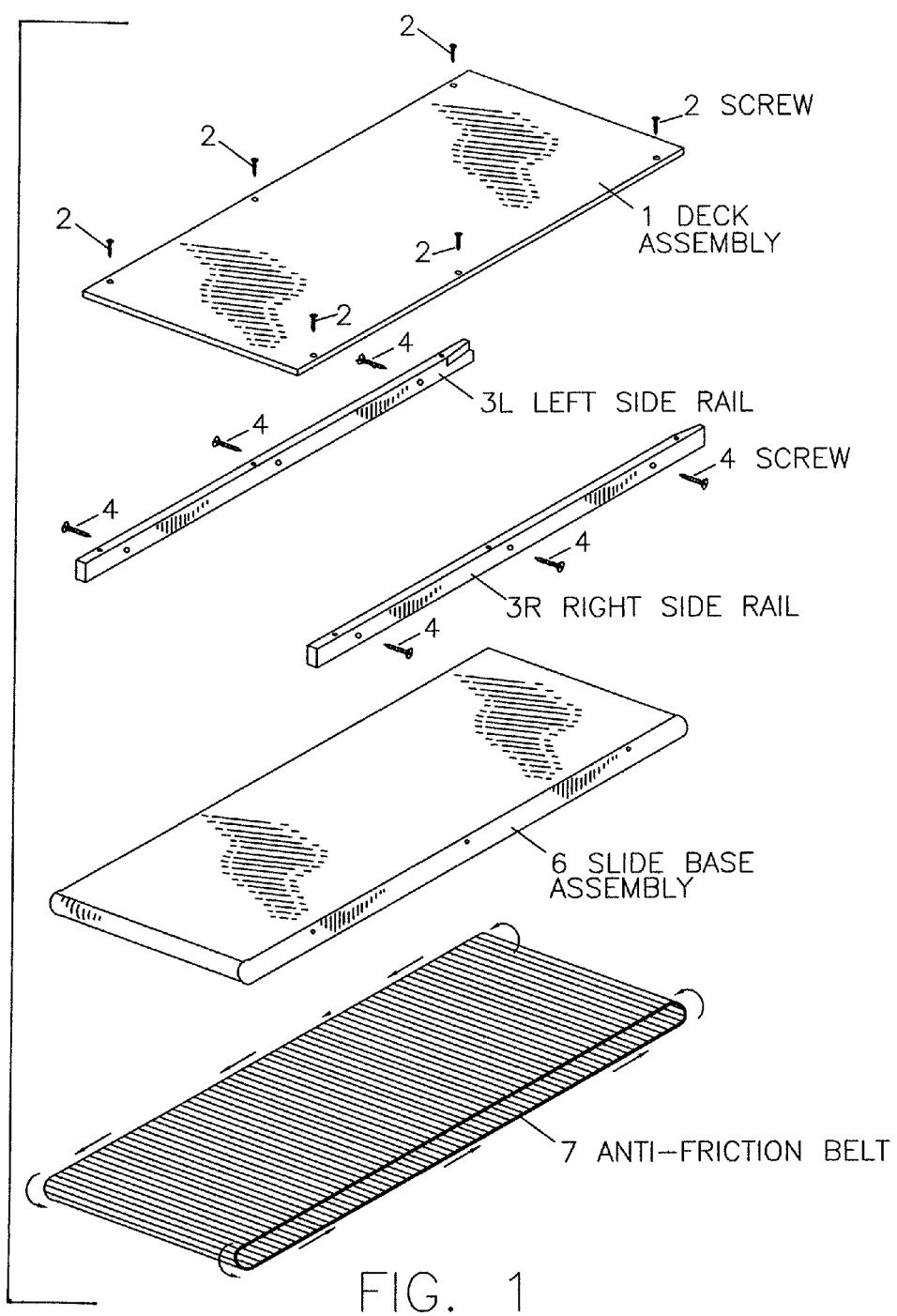
FIG. 1 shows an exploded view of a first embodiment of the sliding device in accordance with the invention.

Referring to FIG. 1, a first embodiment of the sliding device of the present invention has an upper deck 1 mounted with fastener elements (screws) 2 onto the top surfaces of a pair of side rails 3L and 3R. The side rails 3L and 3R have a certain height sufficient to mount with fastener elements (screws) 4 to the side surfaces of an elongated and planar slide base 6. An endless anti-friction belt (or track, band or sheet) 7 is entrained around the slide base 6 to slide by its inner surface thereon when subjected to pulling forces by contact of its outer surface with the ground. The thickness of the slide base 6 and its position of mounting to the side rails 3L and 3R are designed so as to leave a small gap between the upper surface of the slide base 6 and the lower surface of the deck 1 for sliding movement of the endless belt 7 therethrough along its upper run, and to project by a small height beyond the bottom surfaces of the side rails for sliding movement of the endless belt 7 as the lowest contact surface along its lower run in contact with the ground.

Figure 2:
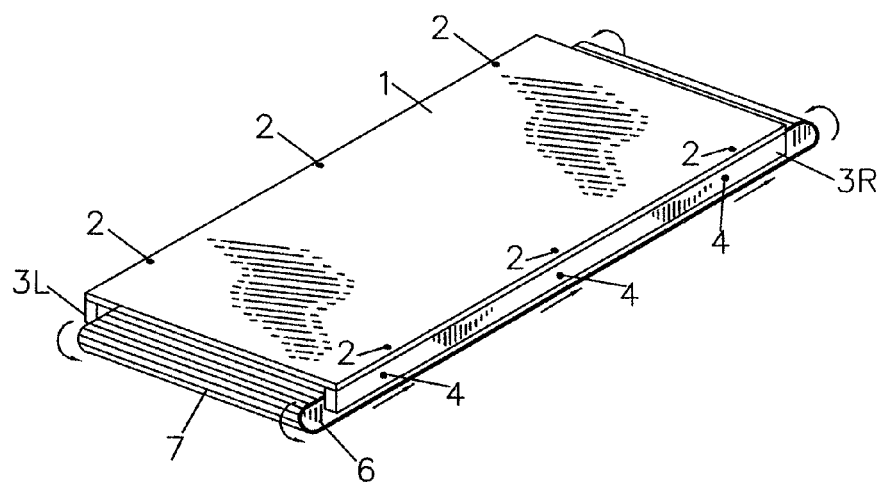
FIG. 2 shows an assembled perspective view of the embodiment of the sliding device shown in FIG. 1.
Figure 3:
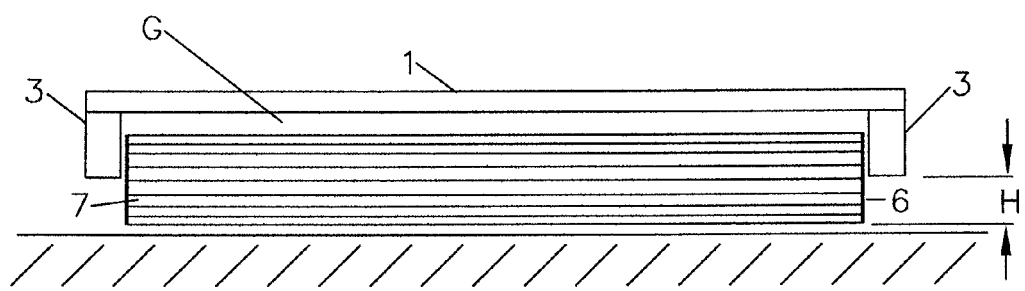
FIG. 3 shows an assembled front view of the embodiment of the sliding device shown in FIG. 1.

In FIG. 2, the slide mechanism is shown in assembled view with the belt 7 sliding between the base 6 and the deck 1 along its upper run and in sliding contact with the ground along its lower run. The interior surfaces of the side rails may be coated with a polyester laminating coating to reduce friction if the rails come into contact with the moving belt. FIG. 3 shows a front view of the slide mechanism, illustrating the small gap G between the base 6 and the deck 1 when mounted to the side rails 3 and the small height H of the belt 7 in sliding contact with the ground along its lower run. Preferably, the assembled slide mechanism provides a ⅝" gap for the height H between the bottom of the belt and the side rails. This prevents the side rails from rubbing on the surface of the slope. A lubricant such as furniture wax or silicone may be applied to the surface of the slide base to increase the sliding speed of the belt (and the board).

In its simplest form, an embodiment of the sliding can be made using a simple board for the upper deck 1 and a thicker board for the base 6, and the endless belt 7 can be made of a heavy gauge plastic sheet cut as a strip and having its ends joined or fused together. For example, the belt may be made of polycarbonate plastic, rated at temperatures in the range of 240° F. or more, with a thickness in the range of 0.020 inch or more. This material is found to have good slide characteristics, bend ability, and stiffness. Slide characteristics are based on the friction of the belt as it travels under the slide base. Bend ability is the force required to bend the belt as it passes around the front/rear radius. Some degree of stiffness is required for continuous tracking of the belt inside the rails. A material that is too soft may bunch up and fold against the side rails when the weight is shifted to the side. Bend ability and stiffness are affected when a thicker material is used. To increase stiffness and not lose bend ability, a thicker material with slots formed widthwise cutting into its thickness for flexibility.

Other suitable materials can be used for the components described. For example, the slide base may be made of a dense foam substrate covered by an outer film or layer of high-density plastic such as Teflon™ or Delrin™ plastic material available from Dow Chemical Corp. The endless belt 7 may be a rubber sheet having an anti-friction film applied to its inner surface, and striated segments on its outer surface to increase flexibility in sliding around the slide base and to reduce suction or adhesion with the ground surface.

Figure 4:
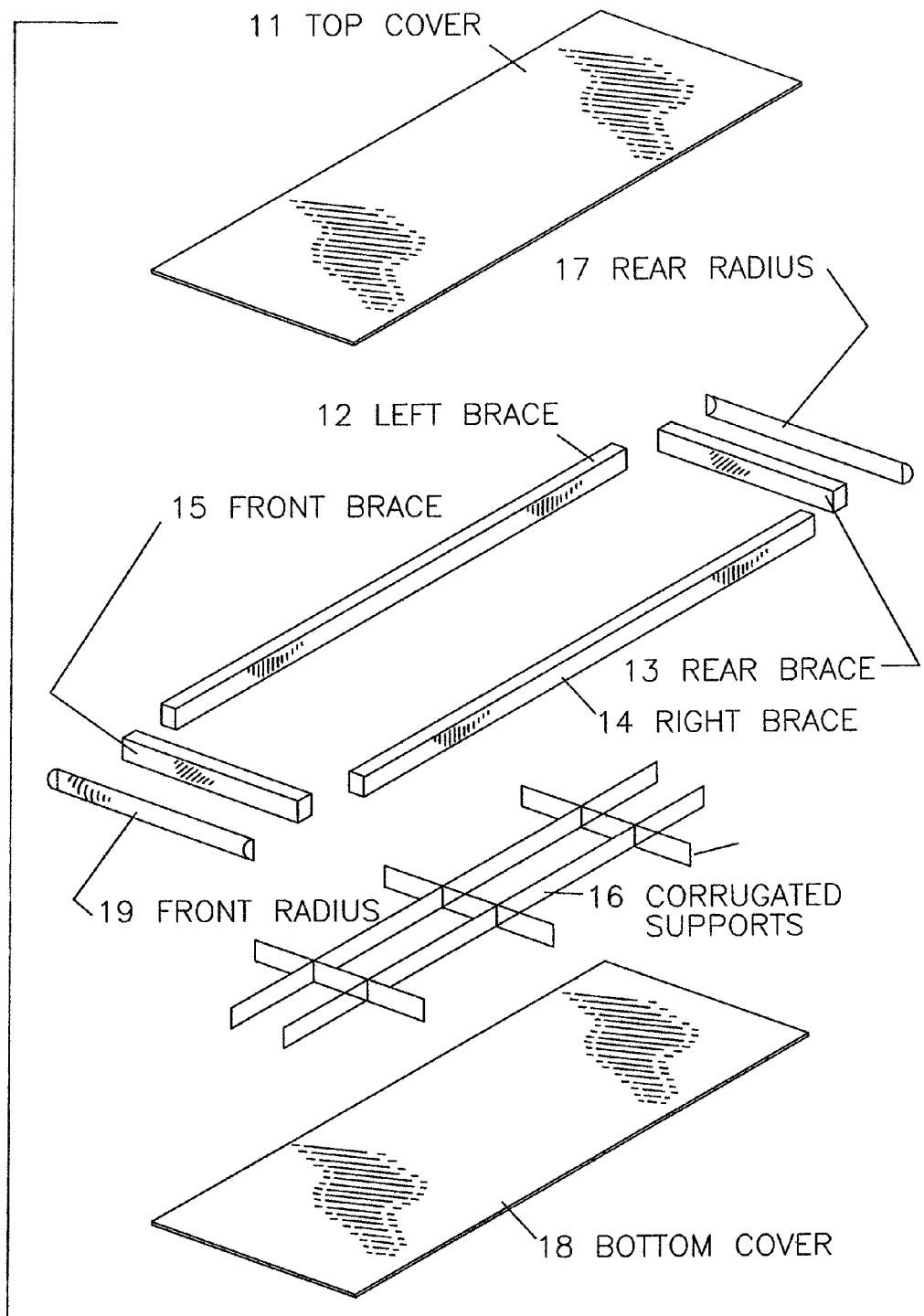
FIG. 4 shows an exploded view of a version of a slide base assembly for the sliding device.

In FIG. 4, a version of a slide base assembly for the sliding device is illustrated as being made of commonly available wood materials. For example, it can be made of top cover 11 and bottom cover 18 made of ⅛" mahogany sheet, a left brace 12, a rear brace 13, a right brace 14, and a front brace 15 made of wood lumber around the lateral edges of the slide base. Corrugated supports 16 may be provided in the interior space of the slide base between the edge braces, such as cardboard, foam, or honeycomb material. The top/bottom covers, braces and supports may be glued together. A front radius 19 and rear radius is glued and also screwed to the front and rear braces to provide the curved end surfaces for entraining the endless belt 7. The rear radius of the slide base may be beveled with a slight inward "V" to reduce the tendency of the belt from binding when re-entering the back of the board. The bottom surface of the bottom cover 18 is sanded for high smoothness. The entire slide base is coated with a polyester laminating coating to provide a very slippery surface for the belt to slide on. The coating may be rated to tolerate frictional forces generating heat at temperatures to 240° F.

Figure 5:
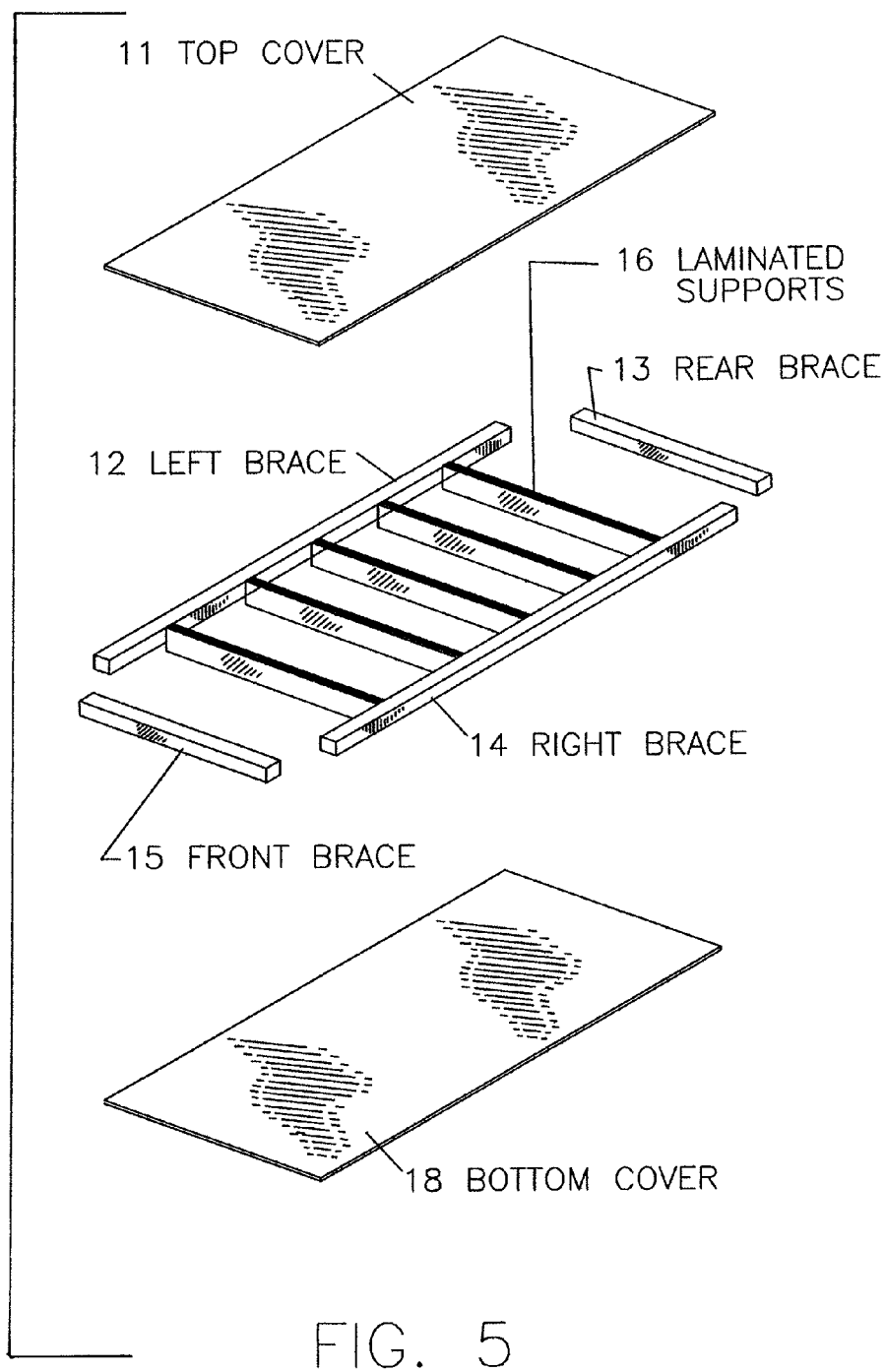
FIG. 5 shows an exploded view of a version of a deck assembly for the sliding device.

In FIG. 5, a version of a deck assembly for the sliding device is shown similarly made of commonly available wood materials. It may be formed of a top cover 11 and bottom cover 18 made of ⅛" mahogany sheet, a left brace 12, a rear brace 13, a right brace 14, a front brace 15, and laminated supports 16 provided in the interior space of the deck. The supports may instead be formed from cardboard, foam, or honeycomb material. The top/bottom covers, braces and supports are glued together.

Figure 6:
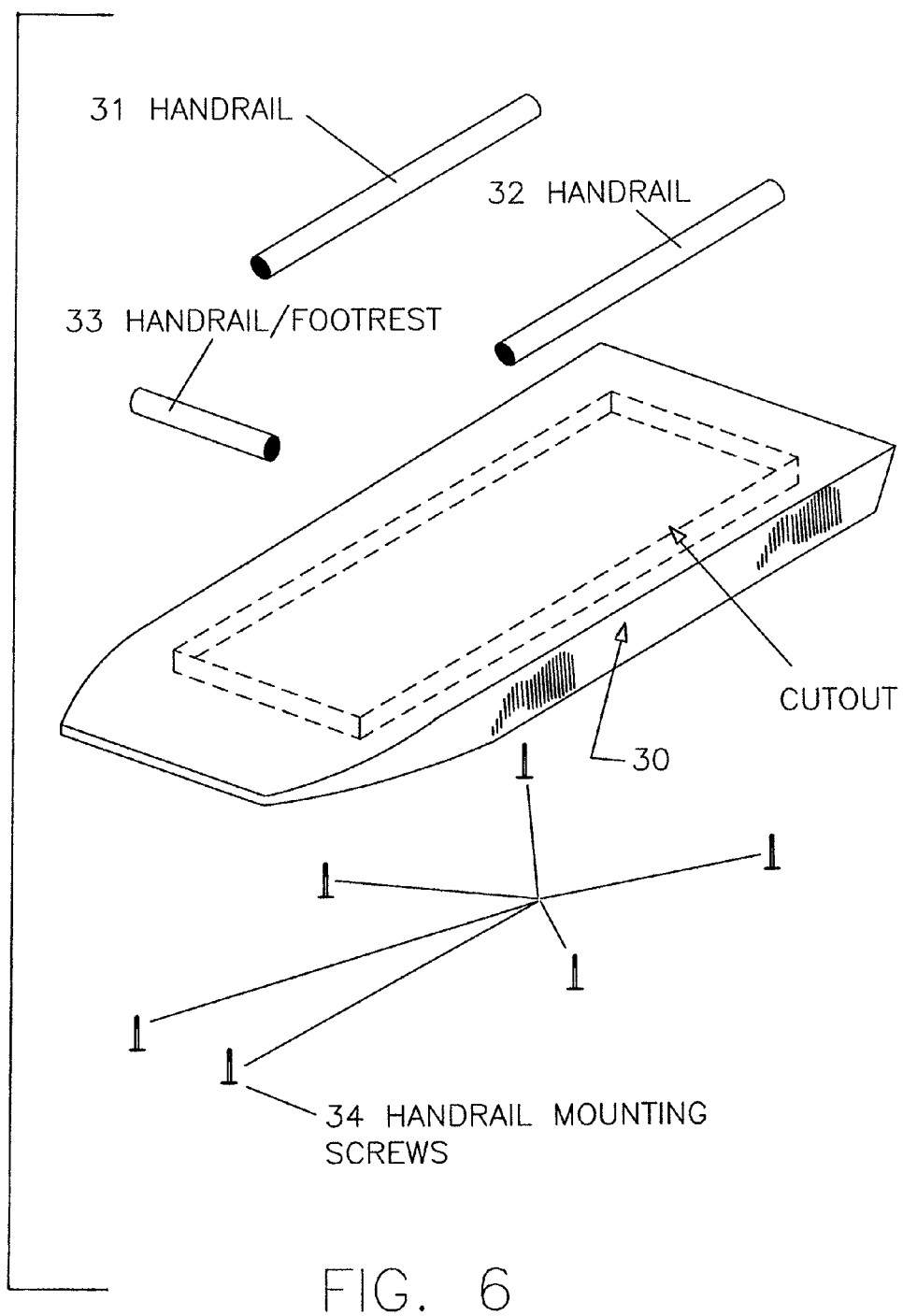
FIG. 6 shows an exploded view of a second embodiment of the sliding device shaped as a body board.

In FIG. 6, a preferred embodiment of the sliding device has a deck assembly made of a molded foam or plastic body 30 having the shape and thickness of body boards commonly used to surf waves. A rectangular cutout or cavity is formed in the bottom of the deck body 30 within which is mounted the slide mechanism by attachment of an upper surface thereof and/or its side rails to the interior walls of the deck body. Side handrails 31 and 32 and a forward handrail or footrest 33 may be attached by mounting screws 34 (from within the bottom cavity) to the upper surface of the deck body 30 to provide handles or rests for the rider to hold or grip onto. The deck material provides a certain amount of resilience for absorbing vibrations and jolts from sliding over the ground. It also has the advantage that it may bend or warp slightly if too much weight is placed on the board. The warping will allow the bottom surface of the deck to rub on the upper run of the belt over the slide base, thereby slowing the motion of the belt and the speed of the sliding. This may provide a useful safety feature reducing the speed in case a heavy person uses the board or more than one person attempt to use the board together.

The molded foam deck body provides the rider with a foam body for comfort and safety. The body may be fabricated of polyurethane into which the cutout is formed for insertion of the slide mechanism. The hand/foot rails may be constructed of a plastic core with foam covering. The rails may be mounted 2" inset from the outer edges of the body to hold the appendages of the rider therein and help to prevent injury. With the slide mechanism recessed in the body cavity, a gap of about ⅝" is provided between the bottom surface of the body and the ground.

Figure 7:
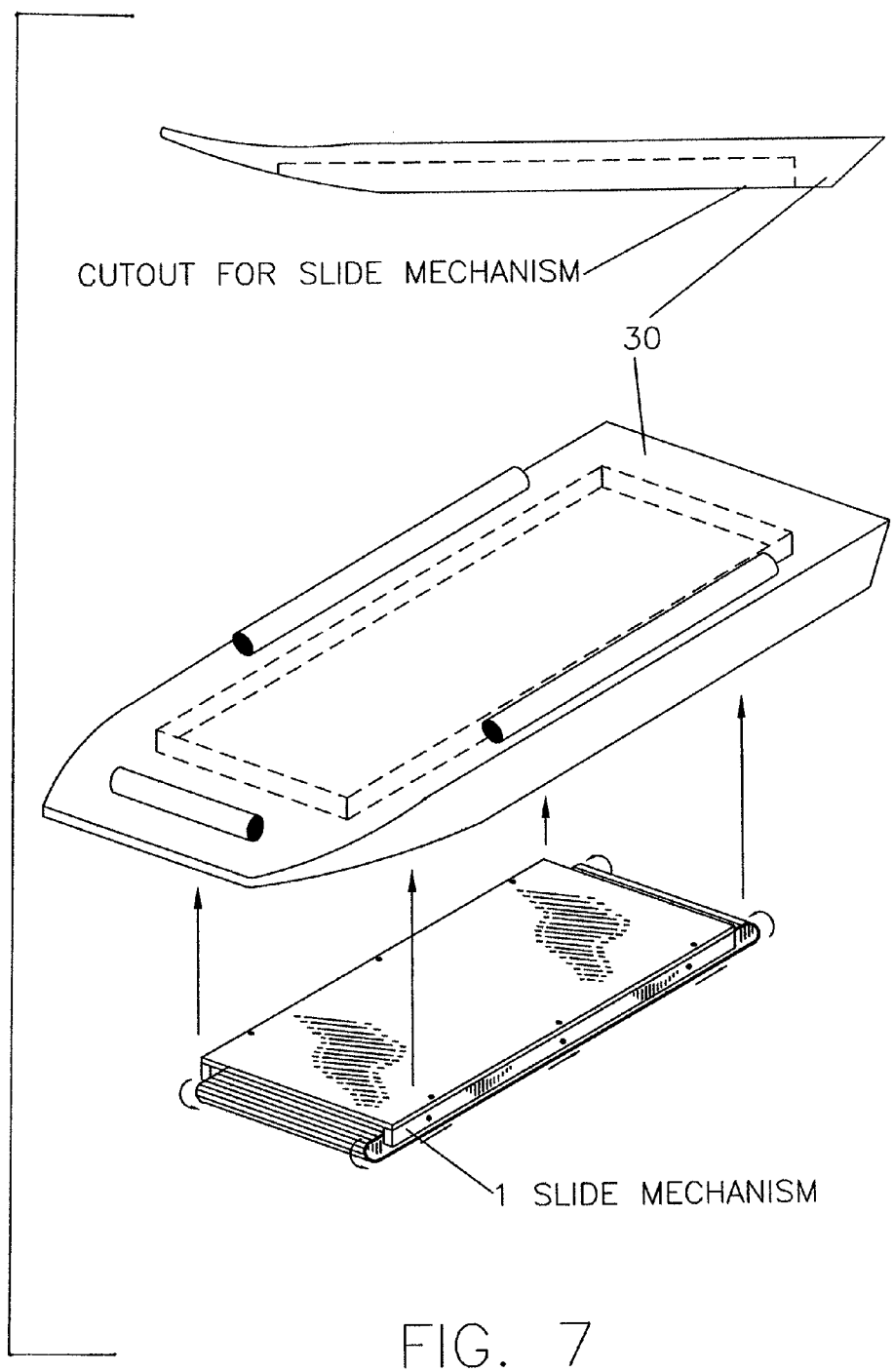
FIG. 7 shows an assembly view of the embodiment of FIG. 6 assembled with a slide mechanism in a recessed cutout in the bottom of the body board.
Figure 8:
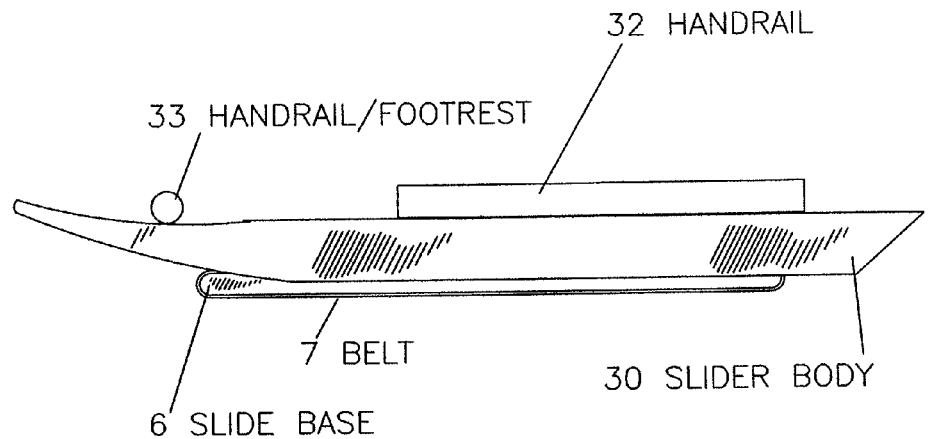
FIG. 8 shows a fully assembled view of the body board embodiment of the sliding device.

In FIG. 7, the molded deck 30 is shown being assembled to the slide mechanism 1 fitting within the cutout formed in the bottom of the deck. Recessing the slide mechanism 1 in the cutout cavity reduces the overall height of the device and separates the mechanism out of the way from the rider to prevent the rider's hands or feet from contacting the moving belt. FIG. 8 shows a fully assembled view of the body board embodiment of the sliding device.

Figure 9:
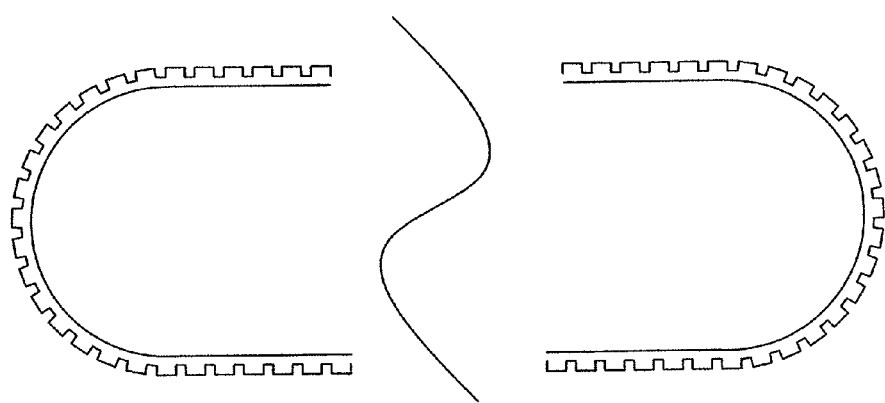
FIG. 9 illustrates using a track belt as the endless anti-friction belt.

FIG. 9 illustrates using a track belt as the endless anti-friction belt. A track belt has thicker tread segments alternating with thinner joint segments, as is well known to those familiar with these materials. The inner surface of the track belt is coated with a polyester laminating coating to provide a very slippery surface. The track belt is more costly but can provide better vibration and shock absorption, positive gripping contact with the ground, and high flexibility in movement around the slide base.

Figure 10:
FIG. 10 shows the endless anti-friction belt entrained around the slide base member.
Figure 11A:
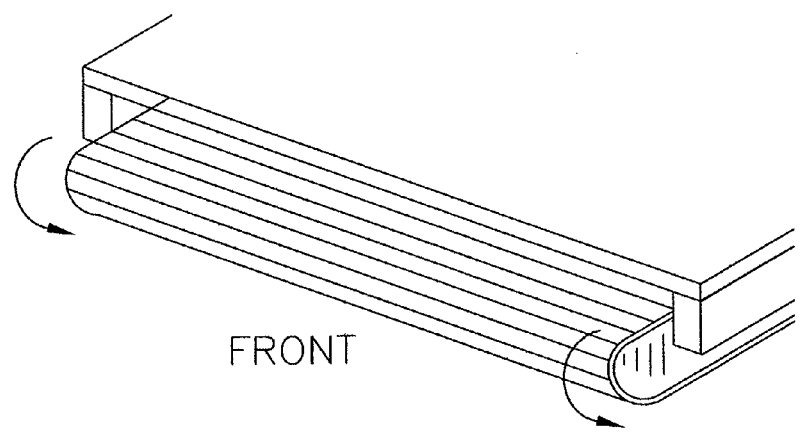
FIGS. 11A and 11B show closeup views of the endless anti-friction belt entrained around the front and rear ends of the slide base member.
Figure 11B:
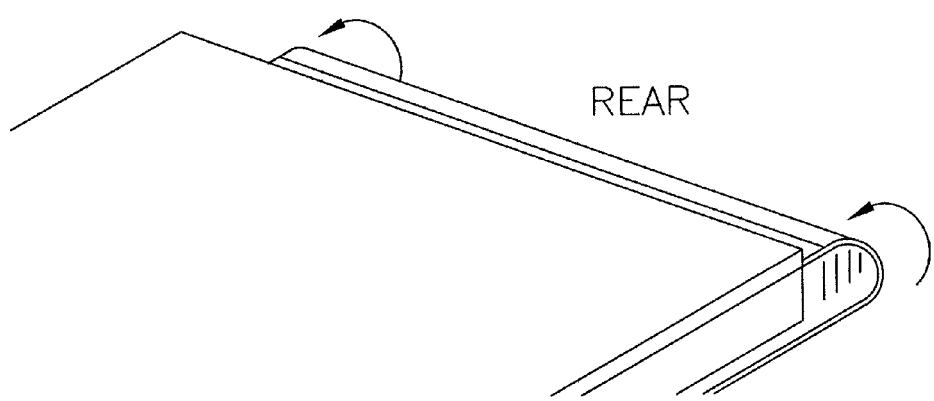

FIG. 10 shows the endless anti-friction belt entrained around the slide base member. The belt makes turns around the front and rear curved ends, as shown in FIGS. 11A and 11B, generating some amount of friction between the belt and the front and rear curved ends or radiuses. The front/rear radiuses preferably have curvature of about ⅝". It is found in testing that increasing the radius of curvature will increase the speed of the board. The interaction of the belt entrained around the radiuses is found to have a "speed-limiting" function by the amount of friction generated between the belt and the curved ends. The greater the radius, the less friction generated, and the higher the speed. A radius of about ⅝" corresponds to a board speed on a typical hill incline that can be safely used by children.

Figure 12:
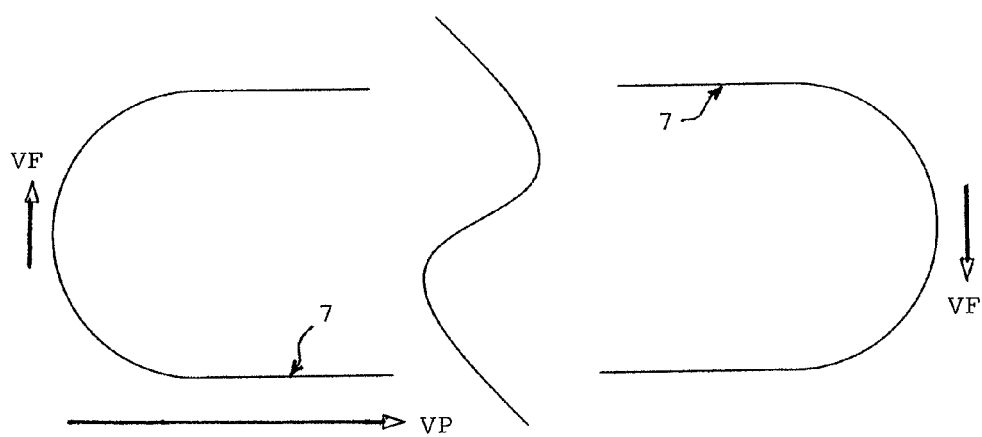
FIG. 12 illustrates how the interaction forces of the endless anti-friction belt entrained around the ends of the slide base member provide a "speed limiting" function.

FIG. 12 illustrates how the interaction forces of the endless anti-friction belt entrained around the ends of the slide base member provide a "speed limiting" function. The vector VP indicates the pulling force on the belt generated by contact of the belt with the ground as the sliding device slides downward under the influence of gravity. The vectors VF indicate the frictional forces generated by the turning movement of the belt around the end radiuses of the slide base which is opposite to the direction of movement of the belt. The frictional force vector increases non-linearly with the speed of movement of the belt, thereby generating greater relative opposition forces as the speed of the belt increases. This results in a "speed-limiting" function that presents an upper limit or terminal velocity that can be achieved for the typical conditions, hill inclines, and weights of riders for which the sliding device is intended to be used.

It will of course occur to those skilled in this field to use other substitutes and equivalent components or materials besides those described above. For example, the belt may be supported on front and back rollers instead of entrained around the curved radiuses of the slide base. If the front radius is replaced with one or more rollers, the friction at the front radius is almost completely eliminated, as the belt can now roll around a roller rather than rubbing on the front radius. Similarly, replacing the rear radius with a roller reduces rear friction loss to a minimum. However, this change would eliminate or reduce the "speed-limiting" function as a safety feature. Installing rollers along the entire bottom surface of the slide base was not found to improve the performance of the sliding device dramatically.

Figure 13A:
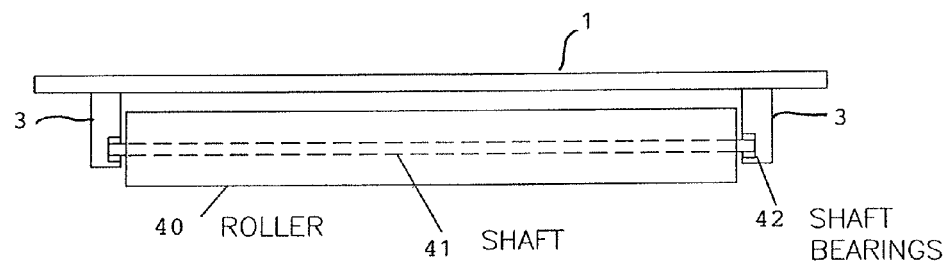
FIGS. 13A and 13B are front and side views of a further embodiment showing a slide base provided with a front roller for tracking of the endless belt at the front end thereof.
Figure 13B:
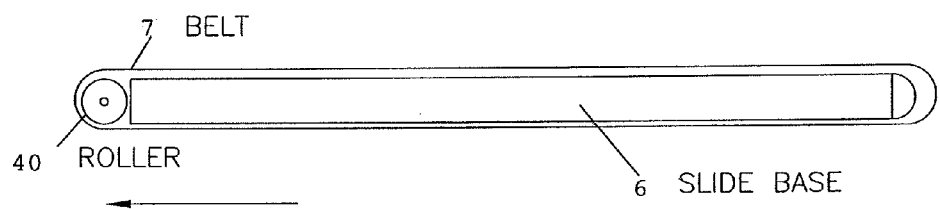

FIGS. 13A and 13B are front and side views of an embodiment showing a slide base provided with a front roller 40 for tracking of the endless belt at the front end thereof. The front roller 3 is mounted on a roller shaft 41 with ends journalled in shaft bearings 42 held in opposite facing sides of the side rails 3 mounted to the underside of the upper deck 1. The front roller enables friction-free tracking of the belt 7 around the front end of the slide base 6.

Figure 14:
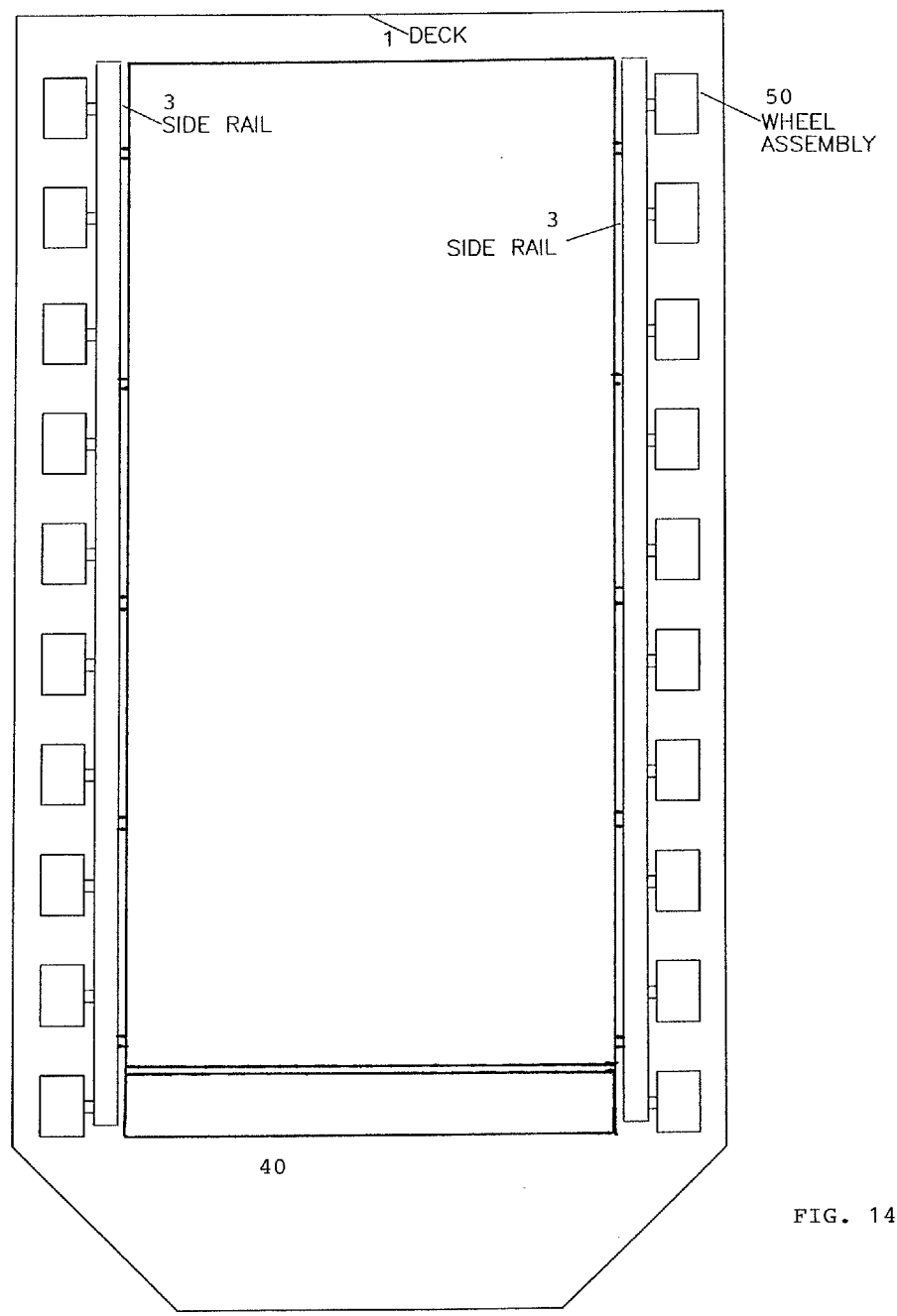
FIG. 14 shows a preferred embodiment of a board device for sliding having rows of outboard wheels provided at respective outboard sides thereof for executing turns while sliding.

FIG. 14 shows a preferred embodiment of a board device for sliding having rows of outboard wheels 50 provided at respective outboard sides on the side rails 3 for executing turns while sliding. The side rails 3 are on opposite transverse sides of the slide base 6 extending in the longitudinal direction substantially the length of the upper deck 1 and spaced apart in the transverse direction by substantially the width of the upper deck 1. The two rows of outboard wheels 50 mounted on the respective outboard sides of the side rails 3 enable a user of the sliding device to execute a turn by shifting weight to the respective outboard side so that contact of the sliding device with the ground shifts from the endless belt on the planar base to the row of wheels on the outboard side for the turn.

Figure 15A:
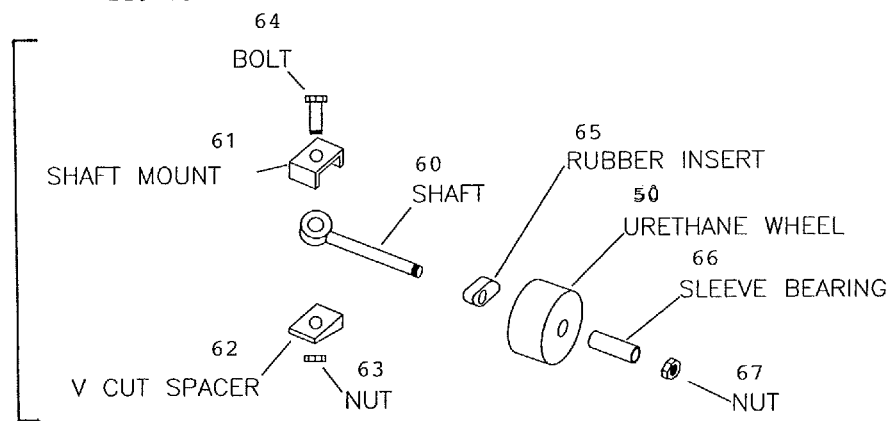
FIGS. 15A, 15B, and 15C show, respectively, an exploded view of components for mounting each outboard wheel, an assembled view of the outboard wheel, and a view showing mounting of the outboard wheel to the side rail.
Figure 15B:
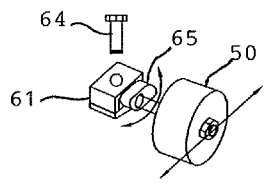
Figure 15C:
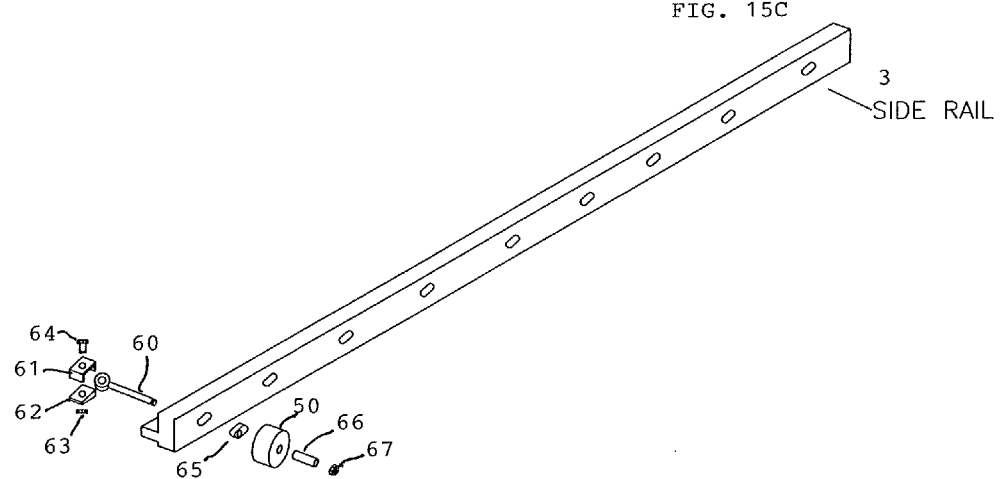

In FIG. 15A, an exploded view shows the components for mounting each outboard wheel, including a shaft 60 with an eyelet end secured between a shaft mount 61 and V cut spacer 62 by a nut 63 and bolt 64. The free end of the shaft is inserted through a mounting insert 65 used to mount the shaft with a slight freedom of movement in a cutout hole in the side rail. On the outboard side of the side rail, the shaft is inserted through a sleeve bearing 66 on which a wheel 50 is rotatably mounted. The wheel assembly is secured to the shaft 60 by a nut 67 secured to the threaded free end of the shaft. The mounting insert is preferably made of an elastically deformable material such as rubber. The wheel may be made of a durable plastic material such as high density urethane. FIG. 15B shows an assembled view of the outboard wheel, in which the straight double-headed arrow indicates the longitudinal direction of movement of the wheel 50, and the curved double-headed arrow indicates the slight deflection movement of the wheel under weight applied to the outboard side during a turn due to mounting with the rubber insert in the cutout of the side rail. FIG. 15C shows the mounting of the outboard wheel 50 to the side rail 3.

Figure 16A:
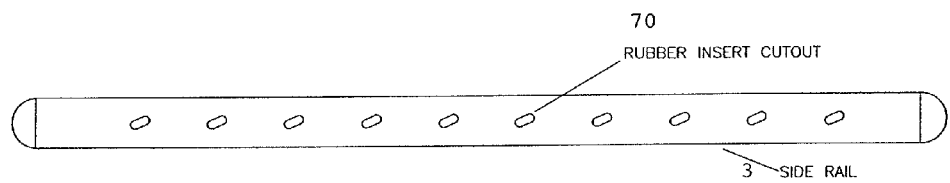
FIG. 16A shows a detail view of the side rail used to mount the outboard wheels.
Figure 16B:
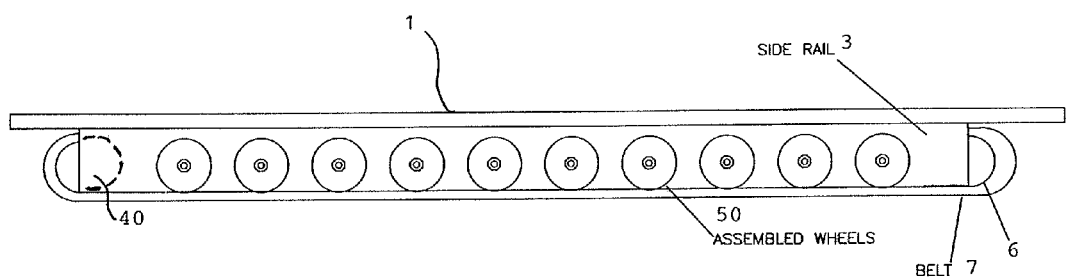
FIG. 16B shows the wheels mounted to the outboard side of the side rail under the sliding board device.

FIG. 16A shows a detail view of the side rail 3 with row of cutouts 70 used to mount the outboard wheels. Each cutout is angled at an upward and rearward inclined angle relative to the length direction of the side rail, which facilitates the slight deflection of the wheel shafts and consequently the wheels upward and rearward under the weight shift of the rider for a turn. FIG. 16B shows the wheels 50 mounted to the outboard side of the side rail 3 under the upper deck 1 of the sliding board device. The sliding belt 7 is also shown mounted inside the side rails 3 for sliding movement around the slide base 6 and front roller 40.

Figure 17:
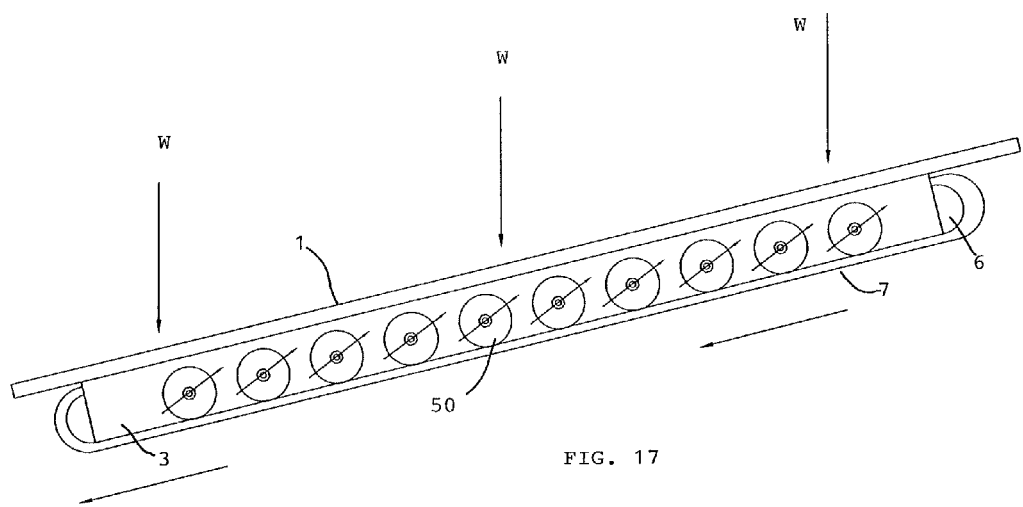
FIG. 17 shows a side view of the sliding board device with outboard wheels sliding in a forward direction down a hill.

FIG. 17 shows a side view of the sliding board device with inboard belt 7 on the slide base 6 for sliding in a forward direction down a hill. The outboard wheels 50 mounted on the side rails 3 enable the user of the board to make smooth turning movements by shifting weight to one or the other transverse side on the upper deck 1. The vertical down arrows indicate the weight shift to the transverse side and the outboard wheels facing outwardly in the figure.

Figure 18:
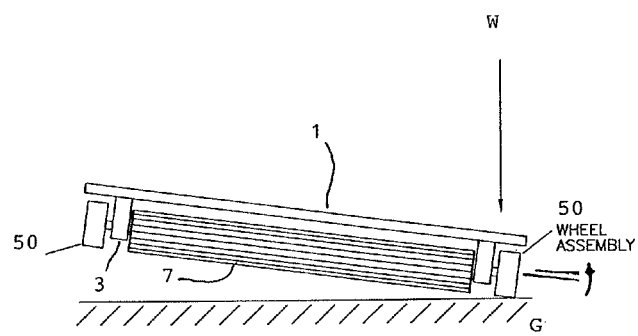
FIG. 18 shows a front view of the sliding board device in a turning movement with outboard wheels making contact with the ground for the turning movement.

FIG. 18 shows a front view of the sliding board device in a turning movement with weight W shifted to the right-hand side in the figure. The weight shift transfer contact with the ground G from the belt 7 inboard of the side rails 3 to the outboard wheels 50 on the outboard side of the side rail 3 on which the weight shift occurs. In this manner, the turning movement is tracked on the row of wheels on the outboard side. In the preferred embodiment, the wheels are provided with elastically deformable inserts 65 in the side rail cutouts 70 to allow the wheels under the weight of a turn to deflect slightly in an upward direction (curved upward arrow in FIG. 18) for better tracking on the ground G when the weight shift causes the slide board to be canted at a slight inclined angle in the turn.

Figure 19:
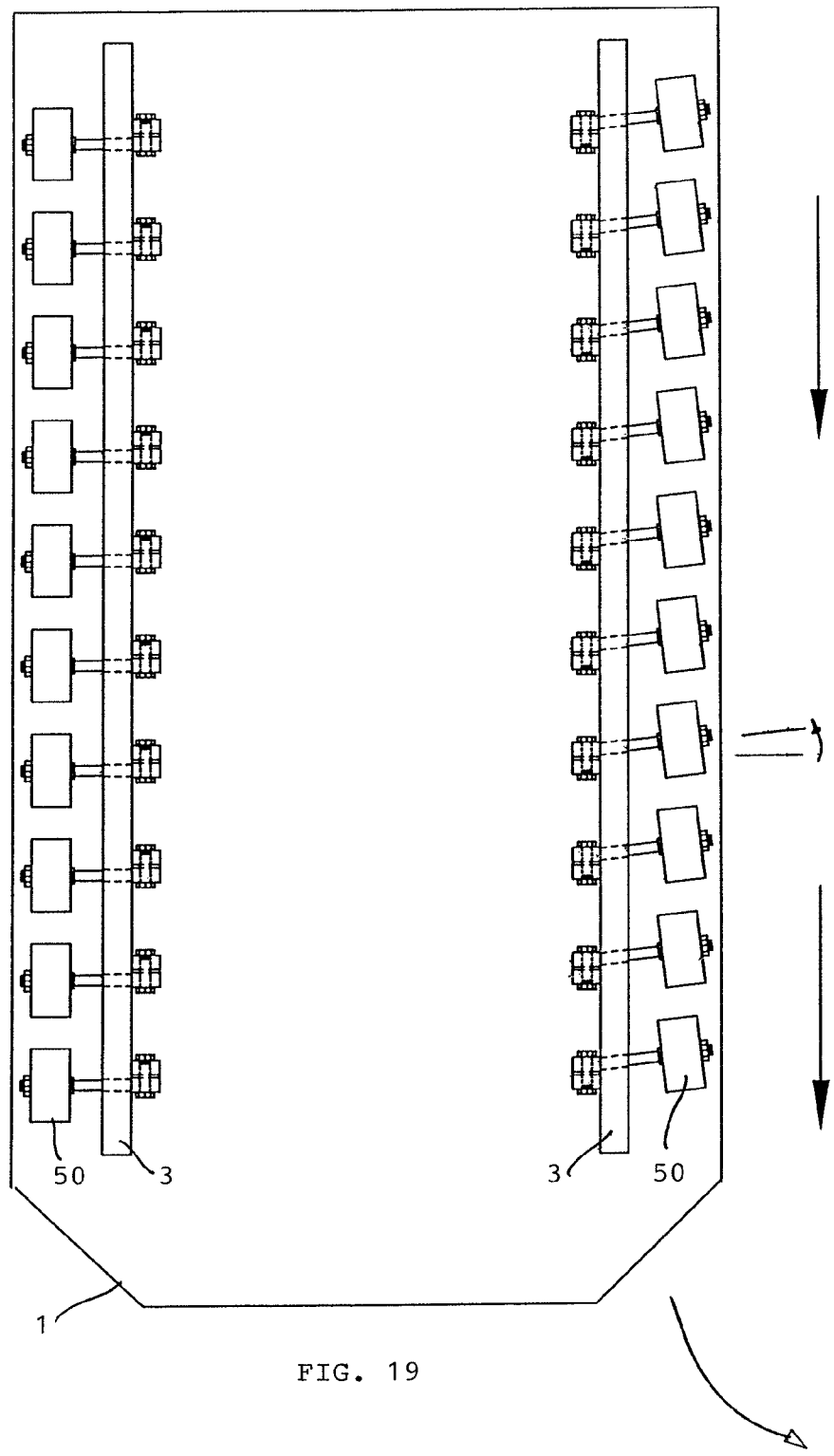
FIG. 19 shows a plan view of the sliding board device in a turning movement with outboard wheels deflected slightly in the rearward direction for tracking through a turning movement.

FIG. 19 shows a plan view of the sliding board device in a turning movement. Due to the mounting of the wheels with elastically deformable inserts in the side rail cutouts, the weight shift of a turn also causes the wheels 50 to deflect slightly in a rear rearward direction (curved rearward arrow in FIG. 19), which causes the wheels to incline rearward and face their wheel fronts in the direction of the turn, thereby allowing for better tracking and making a smooth turn.

The provision of outboard rows of wheels enables the sliding device to carve smooth turns on a downhill slide. The rider may be lying flat on the upper deck as in body surfing, or may be kneeling as in boogie boarding, or standing as in surfing. By shifting weight to one side of the board or other, the rider can cause a weight shift which shifts tracking from the belt on the inboard side of the side rails to the row of wheels on the turning side. The slight deflection of the wheels upward and rearward, allowed by the use of rubber inserts in the cutouts of the side rails, enables the wheels to present their face fronts in the direction of the turn and thereby track through a turn more smoothly.

Figure 20:
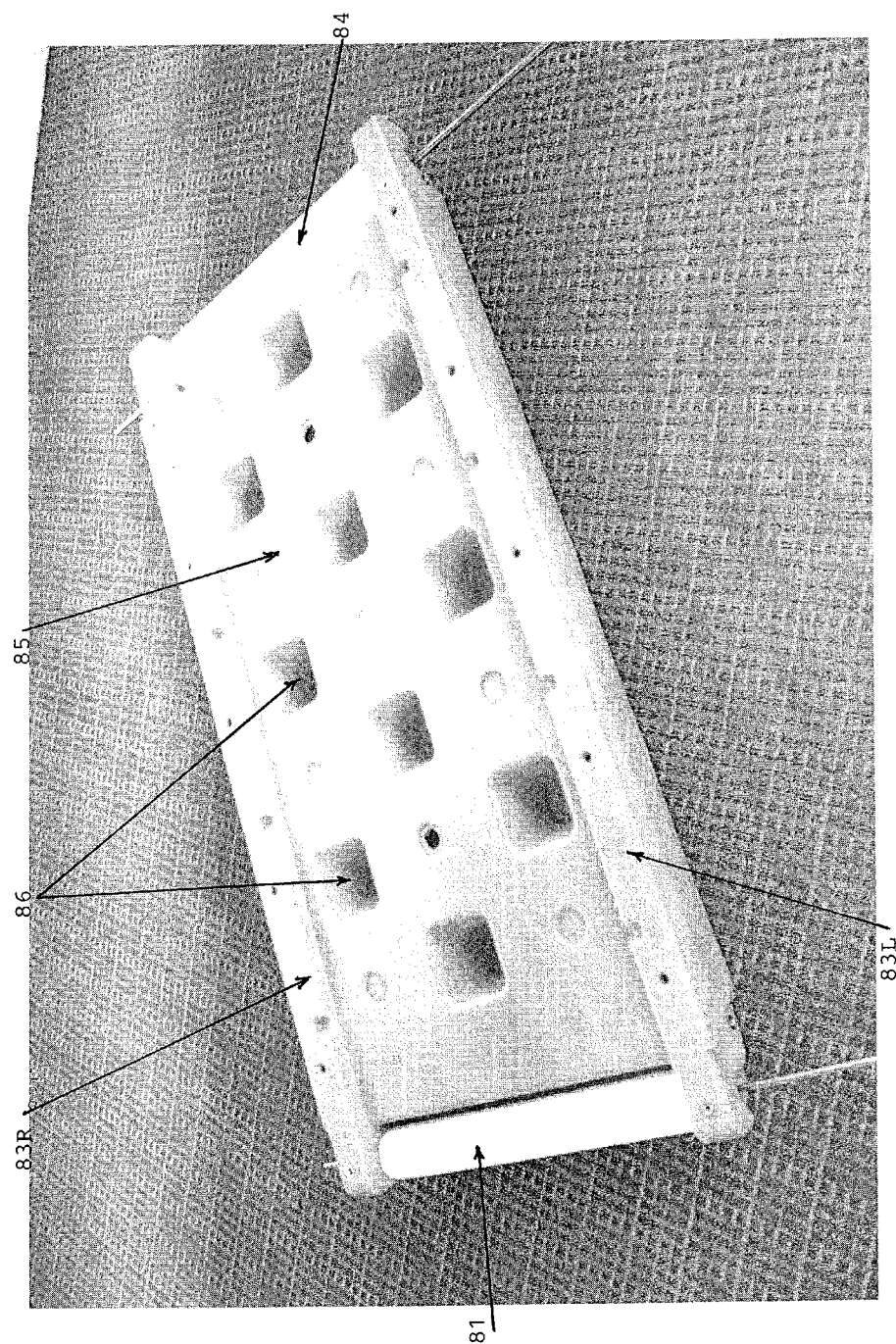
FIG. 20 illustrates another embodiment of the board sliding device having both a front roller and a rear roller over which the belt is entrained.
Figure 21A:
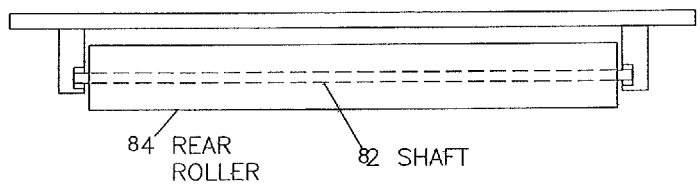
FIG. 21A shows a rear view of the board with rear roller on a roller shaft.
Figure 21B:
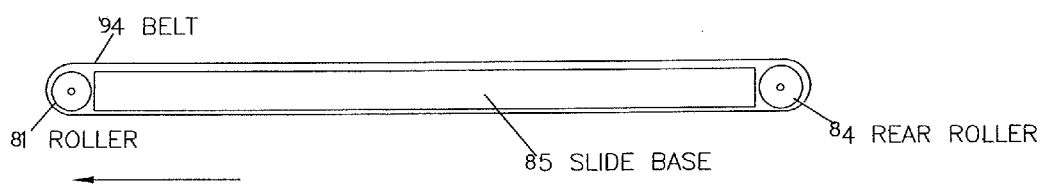
FIG. 21B shows a side view of both rollers mounted transversely to the longitudinal axis of the board.

FIG. 20 illustrates another embodiment of the board sliding device having both a front roller 81 and a rear roller 84 over which the belt 94 is entrained. The belt is entrained to slide longitudinally between side rails 83R and 83L around the top surface, radiused ends, and bottom surface of the planar member. FIG. 21A shows a rear view of the board with rear roller 84 on a roller shaft 82, and FIG. 21B shows a side view of both rollers 81 and 84 mounted on roller shafts transversely to the longitudinal axis of the board. The front and back rollers enable the belt 94 to track straighter and more stably around the slide base, and reduces friction in tracking for higher sliding speeds. In this embodiment, the slide base 85 and side rails 83R and 83L may be molded as a single integrated piece out of strong, durable and rigid plastic material. The piece may be molded as a hollow planar body with cutout wells or honeycomb cells 86 to reduce weight and provide flexibility for the slide base to flex with some degree of give as it traverses over uneven ground. The integrated plastic body may be manufactured in a plastic roto-mold. When molded as a hollow planar body with cutout wells or honeycomb cells, the sliding board can be reduced to as light as about 5 lbs weight. The thickness of the plastic body walls and the number, size and placement of the honeycomb cells are designed for desired flexibility and performance of the sliding board. The endless belt may be modified with a friction-reducing outer surface and/or with a segmented or striated inner surface for better tracking, as described above, for optimal tracking characteristics, resistance to wear, and anti-friction properties.

Figure 22:
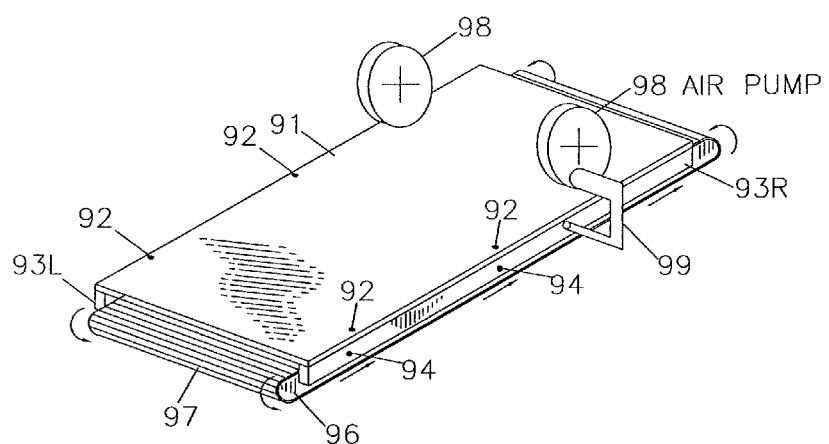
FIG. 22 shows another preferred embodiment of the board sliding device having an air-tight slide base enclosure into which air is pumped and a lower planar member with small air holes to form an air layer between the slide base and belt for reduced belt friction and higher sliding speeds.

FIG. 22 illustrates another preferred embodiment of the board sliding device having an upper deck 91 above an airtight slide base 96 (shown in greater detail in FIGS. 23 and 24) into which air is pumped from one or more portable air pump mechanisms 98 mounted on the board sliding device. The upper deck 91 is attached to left and right side rails 93R and 93L by fasteners 92, and the left and right side rails 93R and 93L are attached to side braces of the slide base 96 by fasteners 94. Air is pumped through connectors 99 into the slide base enclosure. A belt 97 is entrained around the slide base 96. Air holes in a lower planar member of the slide base 96 form an air layer between the slide base and the belt for reduced belt friction and higher sliding speeds.

Figure 23:
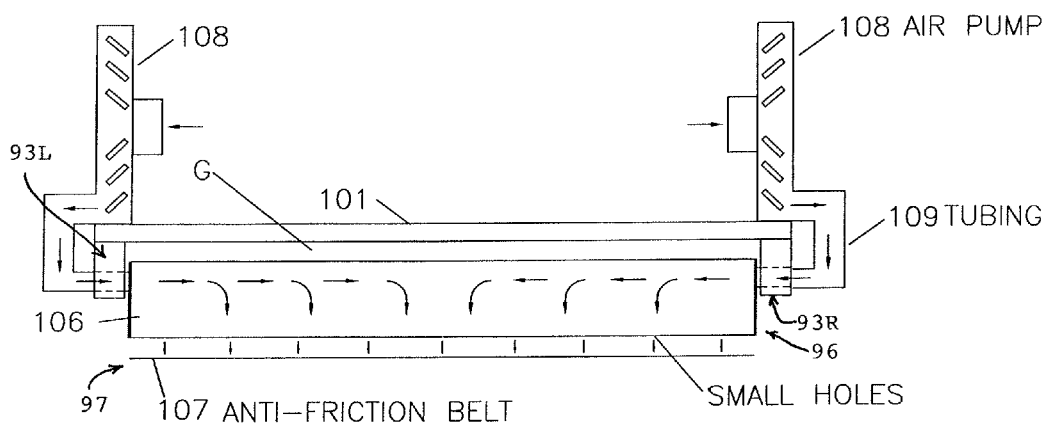
FIG. 23 is a front schematic view of the preferred embodiment of the board sliding device shown in FIG. 22.

FIG. 23 is a front schematic view of the preferred embodiment of the board sliding device shown in FIG. 22. The air pump mechanism has an air pump 108 with an intake portion mounted to upper surface 101 of the upper deck and tubing 109 communicating through side rails 93R, 93L into enclosure 106 of slide base 96. Small air holes 105 formed in a lower planar member of slide base 96 form an air layer between the slide base and lower run 107 of belt 97.

Figure 24:
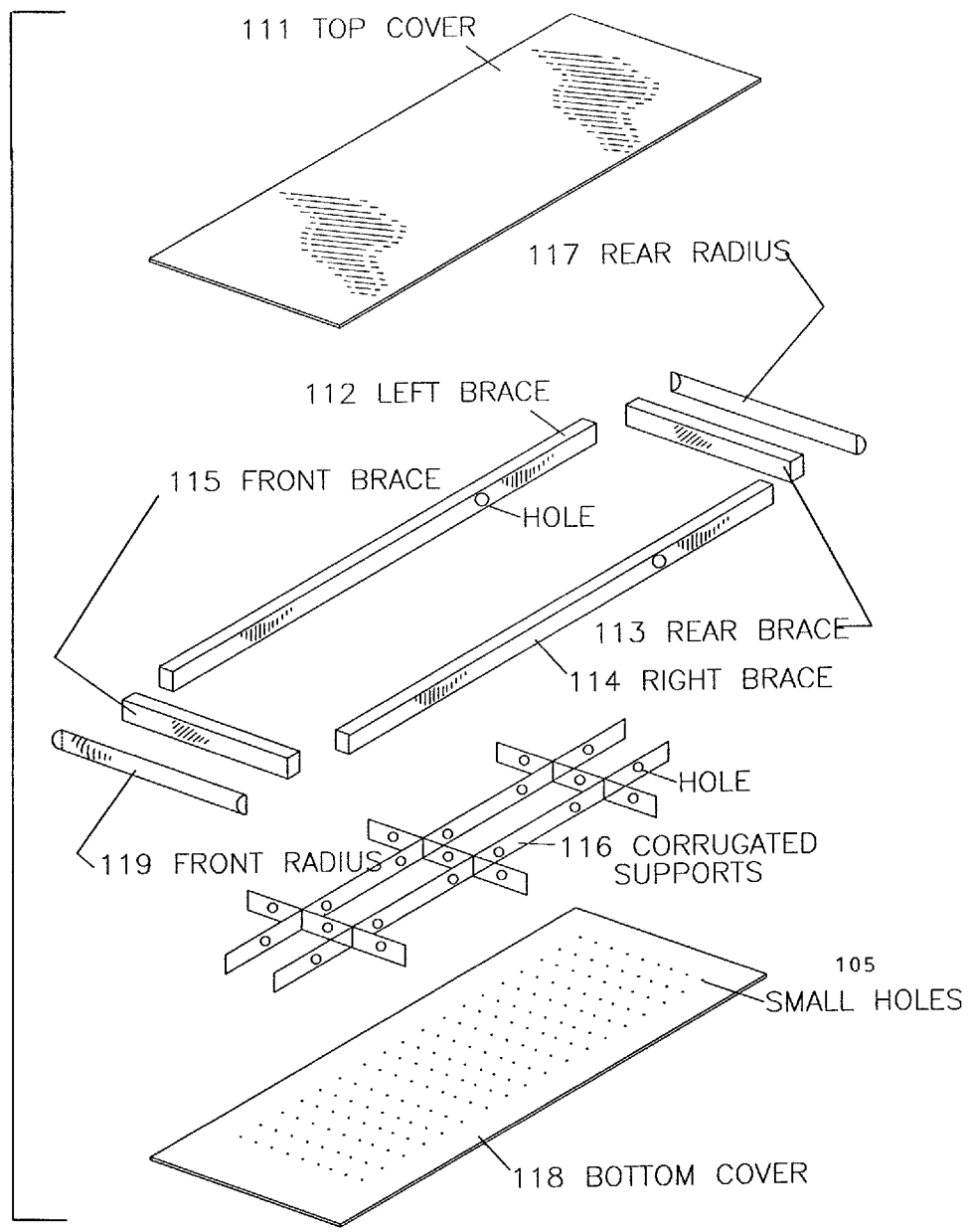
FIG. 24 is an assembly diagram (bracketed) illustrating the structural parts of the preferred embodiment of the board sliding device shown in FIG. 22.

FIG. 24 is an assembly diagram (bracketed) illustrating the structural parts of the preferred embodiment of the board sliding device shown in FIG. 22. Top cover 111 and bottom cover 118 are spaced apart and extend in parallel horizontally as upper and lower planar members. An air-tight enclosure is formed by the top cover 111 and bottom cover 118 being attached to left brace 112, rear brace 113, right brace 114, and front brace 115. Corrugated supports 116 provide an internal support structure in the enclosure and have aperture holes therein for free passage of air. Front radius 119 is attached to the front brace 115, and rear radius 117 is attached to the rear brace 113. Small air holes 105 are formed in bottom cover 118 to allow pressurized (pumped) air out of the slide base enclosure to form an air layer between the slide base and the belt.

The air holes may be formed by drilling an array of spaced holes through the bottom cover to allow air to flow out of the bottom of the slide base and form an air layer between the slide base and the belt (much like an air hockey table).

Typical range of output for the air pumps is 30 inch W/C (water column). A typical drill size for the small holes is 1/32 inch, with an array total of 162 holes in about 620 sq. inches of bottom cover surface. The air pump is preferably of the type that can provide a continuous 30 inch W/C pressure, without a drop in pressure when released through the small holes. With 620 sq. inches of pressurized surface, only 9 inch W/C is required to lift a typical rider up to 200 pounds weight. This air pressure range can be provided using battery operated air pumps. An example of an air pump unit suitable for use is Universal Rechargeable QuickPump, Part No. 2000000834, offered commercially by The Coleman Company, Inc., Wichita, Kans.

Test results show a 90% reduction in force required to push a rider on the board sliding device on a flat grassy surface with an air layer provided to its entrained belt. Using a scale, the force needed to pull a typical rider was measured at 28 pounds, without the air activated, and was reduced to less than 2 pounds when the air pumps were turned on. Tests on a 22° slope show speed and slide distance increases of approximately 25% with the air pumps turned on.

The described principles of the invention may similarly be used for other types of ground sliding devices, such as "summer sleds", "grass skis", "ground skateboards", etc. A comparable unit like the slide mechanism described herein can be fitted for other shapes and configurations of such ground sliding devices. A new product or products can be sold under a trademark such as "LAND SLIDER"™ for the sliding device in order to gain recognition with purchasers.

It is understood that many modifications and variations may be devised given the above description of the principles of the invention. It is intended that all such modifications and variations be considered as within the spirit and scope of this invention, as defined in the following claims.

The invention claimed is:

1. A sliding device for sliding on the ground down a hill or inclined surface, comprising:
    an upper deck thereon extending a given length in a longitudinal direction and a given width in a transverse direction thereof for supporting a rider thereon,
    a slide mechanism which is mounted below and in parallel with the upper deck, having a slide base extending in the longitudinal direction substantially the length of the upper deck and being formed by an upper planar member spaced apart from a lower planar member, both being elongated in the longitudinal direction and forming an enclosure by being fastened to left and right side braces and opposing front and rear braces with radiused ends, and
    an endless anti-friction belt entrained to slide longitudinally around the upper and lower planar and front and rear radiused ends of the slide base so as to enable the sliding device to slide down a hill or inclined surface,
    wherein said slide base is formed as an air tight enclosure provided with a portable air pump mechanism for pumping air into the slide base enclosure, and the lower planar member has an array of small air holes to let pumped air out from the slide base enclosure to form an air layer between the lower planar member and the belt sliding around it for reducing friction between the lower planar member and the belt.

2. A sliding device according to claim 1, wherein the small air holes are formed by drilling an array of spaced holes through the lower planar member.

3. A sliding device according to claim 1, wherein the air pump mechanism provides an output in the range of 30 inch W/C (water column).

4. A sliding device according to claim 1, wherein the small air holes are drilled through the lower planar member with hole size of about 1/32 inch.

5. A sliding device according to claim 1, wherein the small air holes are drilled through the lower planar member in array of about a total of 162 holes in about 620 sq. inches of lower planar member surface.

6. A sliding device according to claim 1, wherein the air pump mechanism provides an output of air that is let through the small air holes with about 9 inch W/C sufficient to lift a typical rider up to 200 pounds in weight.

7. A sliding device according to claim 1, wherein the air pump mechanism employs a battery operated air pump.

8. A sliding device according to claim 1, wherein the air pump mechanism generates an air layer for its entrained belt sufficient for about a 90% reduction in force required to push a rider on the sliding device on a flat grassy surface.

9. A sliding device according to claim 1, wherein said belt is entrained on front and back rollers mounted transversely on front and rear portions of the slide base on.

10. A sliding device according to claim 1, wherein said device is configured in a product for sliding use as one of a group consisting of a body board, boogie board, surfboard, sled, ski, and skateboard.

* * * * *